United States Patent
Gegenhuber

(10) Patent No.: US 12,030,133 B2
(45) Date of Patent: Jul. 9, 2024

(54) METAL STRIP AND PROCESS FOR MANUFACTURING SUCH A METAL STRIP

(71) Applicant: Voestalpine Precision Strip GmbH, Böhlerwerk (AT)

(72) Inventor: Robert Gegenhuber, Bad Hall (AT)

(73) Assignee: Voestalpine Precision Strip GmbH, Böhlerwerk (AT)

( * ) Notice: Subject to any disclaimer, the term of this patent is extended or adjusted under 35 U.S.C. 154(b) by 0 days.

(21) Appl. No.: 18/249,200

(22) PCT Filed: Oct. 18, 2021

(86) PCT No.: PCT/EP2021/078835
§ 371 (c)(1),
(2) Date: Apr. 14, 2023

(87) PCT Pub. No.: WO2022/079319
PCT Pub. Date: Apr. 21, 2022

(65) Prior Publication Data
US 2023/0405719 A1   Dec. 21, 2023

(30) Foreign Application Priority Data
Oct. 16, 2020  (EP) .................................... 20202429

(51) Int. Cl.
| | |
|---|---|
| B23K 26/26 | (2014.01) |
| B23K 26/322 | (2014.01) |
| B23K 35/02 | (2006.01) |
| B23K 35/28 | (2006.01) |
| B23K 35/30 | (2006.01) |
| B32B 3/26 | (2006.01) |
| B32B 7/022 | (2019.01) |
| B32B 15/01 | (2006.01) |
| C22C 9/02 | (2006.01) |

(Continued)

(52) U.S. Cl.
CPC ............ *B23K 26/26* (2013.01); *B23K 26/322* (2013.01); *B23K 35/0238* (2013.01); *B23K 35/286* (2013.01); *B23K 35/302* (2013.01); *B32B 3/263* (2013.01); *B32B 7/022* (2019.01); *B32B 15/017* (2013.01); *C22C 9/02* (2013.01); *B23K 2101/34* (2018.08); *B23K 2101/38* (2018.08); *B23K 2103/10* (2018.08); *B23K 2103/12* (2018.08); *B23K 2103/166* (2018.08); *B32B 2250/02* (2013.01); *B32B 2255/205* (2013.01); *B32B 2307/202* (2013.01); *B32B 2307/536* (2013.01); *B32B 2307/54* (2013.01); *B32B 2307/7376* (2023.05); *B32B 2311/12* (2013.01); *B32B 2311/24* (2013.01); *B32B 2457/00* (2013.01)

(58) Field of Classification Search
None
See application file for complete search history.

(56) References Cited

U.S. PATENT DOCUMENTS

2016/0028177 A1 *  1/2016  Nomura ................. H01R 43/16
                                                           428/626

FOREIGN PATENT DOCUMENTS

| CN | 104669705 A | 6/2015 |
|---|---|---|
| DE | 112014000872 T5 | 11/2015 |

* cited by examiner

*Primary Examiner* — Daniel J. Schleis

(57) ABSTRACT

A metal strip and a process for manufacturing such a metal strip are disclosed. In order to be able to reproducibly manufacture a durable metal strip, it is proposed for a butt seam to extend essentially between a first cladding layer of a first strip transverse portion and a second strip transverse portion.

20 Claims, 3 Drawing Sheets

(51) Int. Cl.
*B23K 101/34* (2006.01)
*B23K 101/38* (2006.01)
*B23K 103/10* (2006.01)
*B23K 103/12* (2006.01)
*B23K 103/16* (2006.01)

METAL STRIP AND PROCESS FOR MANUFACTURING SUCH A METAL STRIP

FIELD OF THE INVENTION

The invention relates to a metal strip and a process for manufacturing such a metal strip.

DESCRIPTION OF THE PRIOR ART

In order manufacture a hybrid metal strip for electrical applications out of two metal strips that are bonded to each other longitudinally and are composed of different base metals—for example aluminum and copper—it is known to butt-weld the two metal strips to each other along the longitudinal edge.

This is accompanied by the production of disadvantageous intermetallic phases from the melt, which can impair the durability and the quality of the welded connection and thus can also jeopardize the mechanical reliability of the metal strip in the course of its further processing. In addition, these intermetallic phases in the structure reduce the electrical conductivity, which reduces the use of the metal strip for manufacturing electrically conductive components. These components also exhibit a reduced fatigue load capacity.

In order to minimize the formation of such disadvantageous intermetallic phases as much as possible, complex welding methods are known, for example ultrasonic welding methods or friction stir welding methods. Such methods, however, are not suitable for a continuous manufacturing process.

Alternatively to welding, it is also known to integrally bond metal strips, which have different base metals, to each other using a cladding process. Roll-cladding is disadvantageously limited with regard to the strength of the joining partners—more particularly, it is impossible or nearly impossible to clad a metal strip made of copper or a copper alloy with a tensile strength $(R_m) \geq 360$ MPa so that for these metal strips, it is necessary to rely on a welded connection—with all of the disadvantages of the welding sector.

SUMMARY OF THE INVENTION

The object of the invention, therefore, is to modify a metal strip—which, as explained at the beginning, is composed of two metal strips that are joined to each other longitudinally and have different base metals—such that this can, without limitation as to the strength, achieve a comparatively high mechanical durability and/or high electrical conductivity.

Another object of the invention is to provide a reproducible, simple, and/or inexpensive process for manufacturing such a metal strip.

If the first metal strip has a first cladding layer made of copper or a copper alloy provided along at least one longitudinal edge on the first base layer, then it is possible to ensure a mechanically and/or electrically reliable integral bond between the first strip transverse portion, which has a first base layer made of aluminum or an aluminum alloy, and the second strip transverse portion, which has a second base layer made of copper or a copper alloy with a strength>360 MPa. Due to the multilayered structure of the first metal strip at its longitudinal edge or longitudinal side, the cladding layer specifically offers the possibility that the butt seam extends essentially between the first cladding layer of the first strip transverse portion and the second strip transverse portion, as a result of which, there is no danger of any disadvantageous intermetallic phases—or none to any appreciable degree—forming in the butt seam. The butt seam therefore also does not have any brittle phases, which reduce the strength or the electrical conductivity, as a result of which the metal strip according to the invention can be particularly suitable, for example, for electrical components like contacts.

In addition, the metal strip according to the invention does not suffer from the kind of reduced durability that is known in other metal strips—this therefore ensures the production of reliable finished products. This is particularly true since the second strip section has a comparatively high tensile strength $(R_m) \geq 360$ MPa.

The metal strip according to the invention can therefore durably unite a wide variety of properties of different material groups.

More particularly, the metal strip can be suitable for electrical applications if the aluminum alloy has an electrical conductivity of at least 9 MS/m (megasiemens/m). Preferably, the first base layer has an electrical conductivity of at least 18 MS/m.

An occurrence of these disadvantageous intermetallic phases can be further suppressed if the butt seam extends exclusively between the first cladding layer and the second strip transverse portion. Preferably, the butt seam extends exclusively between the first cladding layer and the second base layer.

Preferably, the first strip transverse portion has a first strip thickness that is greater than or equal to the second strip thickness of the second strip transverse portion in order to thus be able provide, for example, a semi-finished product that is individually adapted for further processing.

A high quality butt seam can be achieved, for example, if the second strip thickness of the second strip transverse portion is less than or equal to the layer thickness of the first cladding layer that the second strip transverse portion adjoins.

It can turn out to be particularly advantageous if a thickness ratio of the first strip thickness of the first strip transverse portion to the second strip thickness of the second strip transverse portion is from 1:1 to 1:0.2, more particularly from 1:0.6 to 1:0.7.

Preferably, the second base layer of the second metal strip or more precisely of the second strip transverse portion consists of a hardenable copper alloy. For this purpose, this second base layer can be CuNiSi-based. Preferably, the second base layer consists of a CuNi1.5Si, CuNi3Si1Mg, or CuNi2SiSn alloy.

Alternatively, it is conceivable for the second base layer to consist of a low-alloy copper alloy, namely such as a CuFe2P alloy.

It is also conceivable for the second base layer to consist of a Cu—Sn alloy, namely such as a CuSn6 alloy, for example in the cold strain-hardened state.

It is also conceivable for the second metal strip to have an inorganic coating. This coating is preferably provided on the second base layer. This coating can be formed, for example, by means of a hot tin-plating method with for example 2-10 μm tin or for example by means of a galvanic method with for example 1-3 μm Ni-flash, topped with 2-6 μm tin, for example.

If the first cladding layer has a tensile strength $(R_m)<420$ MPa, for example, then it is possible to ensure a durable integral bonding to the base layer or to another layer of the first metal strip. More particularly, this can be improved even further if the first cladding layer has a tensile strength $(R_m)<360$ MPa.

Preferably, the first cladding layer consists of copper, more particularly of copper with the material designation EN CW008A.

Alternatively, it is conceivable for the first cladding layer to consist of a low-alloy copper alloy.

A first cladding layer composed of a CuSn alloy, namely such as CuSn6, for example in the soft/soft-annealed state, is also conceivable.

The formation of harmful intermetallic phases can be suppressed even further if the first strip transverse portion has a recess that is recessed relative to the cladding layer at the longitudinal edge. This recess can be embodied, for example, as a bevel or notch.

Preferably, the first cladding layer and the first base layer are roll-cladded, which can achieve a comparatively durable bonding of the cladding layer to the base layer.

A durable welded connection can also be achieved if the butt seam is embodied as an I-seam.

In particular, the metal strip according to the invention can be suitable as a semi-finished product or feedstock in order to thus produce at least one electrical component such as an electrical contact by means of a stamping process, for example.

Since the first metal strip and the second metal strip are welded to each other continuously along the longitudinal side in a butt joint in that the second metal strip, which adjoins the first cladding layer in an essentially abutting fashion, is welded to this first cladding layer, the intermetallic phases that are usually produced when welding different material groups can be suppressed, which phases have a harmful influence on the durability of the weld seam. For this purpose, the first cladding layer is provided on the first base layer along at least the longitudinal edge of the first metal strip. The first metal strip is thus multilayered at this longitudinal edge or longitudinal side. This more particularly enhances the reproducibility of the process for manufacturing the metal strip according to the invention.

Preferably, the first metal strip and the second metal strip are welded to each other continuously for this purpose.

This reproducibility of the process can be further improved if the second metal strip exclusively adjoins the first cladding layer in an abutting fashion —more particularly if the second base layer exclusively adjoins the first cladding layer in an abutting fashion.

If the first metal strip and the second metal strip are welded to each other with the aid of a beam welding process, this can further enhance the reproducibility of the process for manufacturing a durable metal strip. More particularly, it can turn out to be advantageous to use a laser for the beam welding process. With this laser, a narrow butt seam can be produced and/or the resulting comparatively small heat flow zones make it possible to further reduce the occurrence of disadvantageous intermetallic phases or even to avoid the occurrence of them altogether.

Preferably, the first cladding layer and the first base layer are roll-cladded in order to reproducibly achieve a multilayered first metal strip with a high degree of cohesion of the layers.

The fact that for example before the welding, the first metal strip is provided with a recess that is recessed relative to the cladding layer at the longitudinal edge, more particularly a bevel or notch, makes it possible to further reduce the danger of harmful intermetallic phases forming in the weld seam due to a mixing of the first and second base layers.

BRIEF DESCRIPTION OF THE DRAWINGS

The subject matter of the invention is shown in greater detail in the figures based on several embodiment variants. In the drawings.

DETAILED DESCRIPTION OF THE PREFERRED EMBODIMENTS

Figure 1:
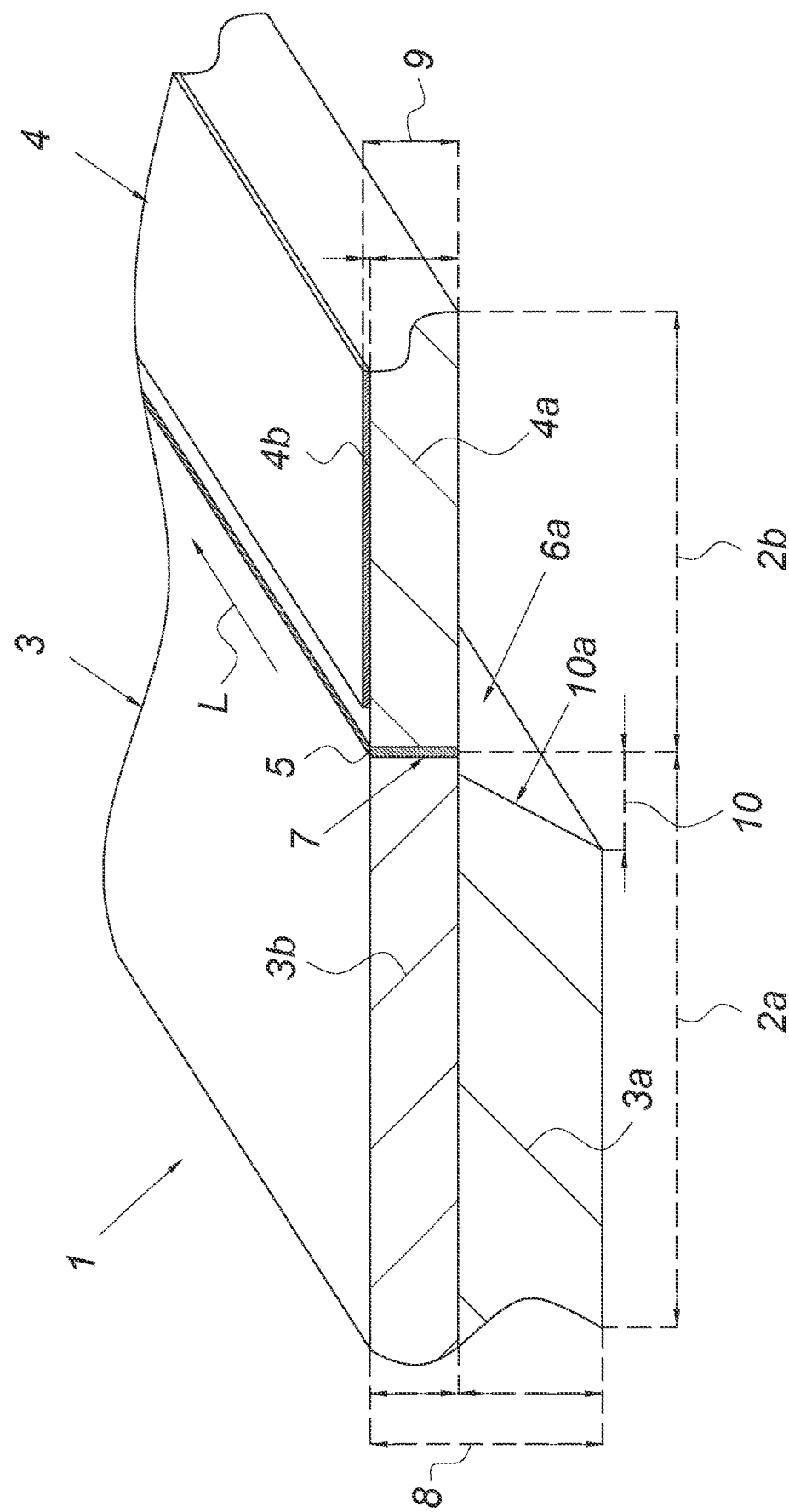
FIG. 1 shows a side view of a transversely cut metal strip according to a first exemplary embodiment.

By way of example, FIG. 1 shows a metal strip 1 according to a first exemplary embodiment, which has a first strip transverse portion 2a and a second strip transverse portion 2b.

The first strip transverse portion 2a is formed by a first metal strip 3 and the second strip transverse portion 2b is formed by a second metal strip 4, which are integrally bonded to each other—specifically by means of a butt seam 5 extending along the metal strip 1. This butt seam 5 extends continuously in the longitudinal direction L of the metal strip 1.

The first metal strip 3 has a first base layer 3a made of an aluminum alloy.

The second metal strip 4 has a second base layer 4a made of a copper alloy and has a tensile strength $(R_m) \geq 360$ MPa (tensile test in accordance with the DIN EN ISO 6892-1 standard).

Due to this comparatively high tensile strength of the second metal strip 4, a joining method is limited to a welding method—which with the different base metals of the metal strips 3, 4 would produce disadvantageous intermetallic phases. Such phases disadvantageously reduce the strength and/or ductility and/or electrical conductivity of the welded connection, which reduces the durability of the metal strip 1 for example with regard to their capacity to be further processed into a component, for example by means of forming, in particular deep-drawing.

According to the invention, this disadvantage is avoided by embodying the first metal strip 3 in a special way, namely it has a first and outer cladding layer 3b made of copper.

This first cladding layer 3b is positioned along at least one longitudinal edge 6a or longitudinal side of the first metal strip 3 and is provided on the first base layer 3a there. The first metal strip 3 is thus embodied as multilayered, namely with two layers, at this longitudinal edge 6a, wherein one or more other layers, for example one or more intermediate layer(s), not shown, can conceivably be provided, which is/are not shown in the drawings.

In the exemplary embodiment shown in FIG. 1, the first cladding layer 3b also forms a coating over the entire area of the first base layer 3a, namely on the flat side of the base layer 3a. The first metal strip 3 is thus cladded on one side —a base layer 3a that is cladded on two sides is also conceivable, but this is not shown in the drawings.

First of all, due to the cladded joining bond of the first base layer 3a and first cladding layer 3b—despite their different base metals—it is possible to avoid the formation of harmful intermetallic phases between the two.

In particular, however, the first cladding layer 3b offers the possibility of providing the metal strip 1 with a second strip transverse portion 2b that has a copper alloy and a tensile strength $(R_m) \geq 360$ MPa. This is achieved because the butt seam 5 extends essentially between the first cladding layer 3b of the first strip transverse portion 2a and the second strip transverse portion 2b.

This avoids the occurrence of disadvantageous intermetallic phases in the joining bond between the two strip transverse portions 2a and 2b.

In addition, this first cladding layer 3b also makes it much easier to manufacture the metal strip 1. It is thus possible, namely, for the first metal strip and the second metal strip to be welded to each other continuously along the longitudinal side forming a butt-joint 7 in that the second metal strip 4, which adjoins the first cladding layer 3b in an essentially abutting fashion, is welded to this first cladding layer 3b.

This achieves a durable integral bond between the first metal strip 3 and the second metal strip 4 because a mixing of the different-type base metals of the base materials 3a, 4b is slight and can even be avoided entirely. This is particularly true if this butt seam 5 is embodied as an I-seam, as shown in FIG. 1, and the metal strips 3, 4 are welded with the aid of a beam welding process using a laser. More particularly, the latter can also further simplify the continuous manufacture of the metal strip 1.

As can be inferred from FIG. 1, the butt seam 5 extends exclusively between the first cladding layer 3b and the second base layer 4a. The coating 4b that is provided on the second base layer 4a and is optional was removed in the region of the bonding surface before the integral bonding was carried out.

This coating 4b can, for example, be a layer of tin 2 to 10 μm thick. Other coatings are conceivable, for example a galvanic coating. It is also conceivable for the coating 4b to be incorporated into the weld.

A preferred material combination in the metal strip 1 is:
First strip transverse portion 2a or first metal strip 3:
first base layer 3a made of 99.5% Al (EN AW-1050A) in the H14 or H24 state with an electrical conductivity of 34-36 MS/m.
first cladding layer 3b made of Cu—OF (material designation: EN CW008A) with a tensile strength ($R_m$) of 200 to 280 MPa.
Second strip transverse portion 2b or second metal strip 4:
second base layer 4a made of CuNi3Si1Mg with a tensile strength ($R_m$) of 620 to 760 MPa
possible coating 4b, for example a layer of tin 4 μm thick.

For example across all of the strip transverse portions 2a, 2b, the metal strip 1 has a strip thickness of 0.2 to 3.5 mm, preferably 0.4 to 3 mm. It is also conceivable, for example, for the strip width of the whole metal strip 1 to be from 10 to 250 mm, preferably from 40 to 150 mm.

The first metal strip 3 has a greater first strip thickness 8 than the second strip thickness 9 of the second metal strip 4. In the preferred material combination, there is a thickness ratio of the first strip thickness 8 of the first strip transverse portion 2a to the second strip thickness 9 of the second strip transverse portion 2b of from 1:0.73 to 1:0.78.

As can be inferred from the exemplary embodiment, the first cladding layer 3b has a tensile strength ($R_m$)<420 MPa, which for example enables a reproducible roll-cladding on the first base layer 3a.

As is also apparent in FIG. 1, on the longitudinal edge 6a or longitudinal side, a recess 10 in the form of a bevel 10a is visible. This recess 10 is formed due to the fact that the first base layer 3a is recessed relative to the first cladding layer 3b. The first metal strip 3 is therefore uneven, or more precisely step-shaped, at its longitudinal edge 6a. Preferably, this recess 10 is provided in the first base layer 3a by means of a cutting process, for example by means of a material-removing machining process, before the two metal strips 3, 4 are brought into an abutting position against each other for the welding.

Figure 2:
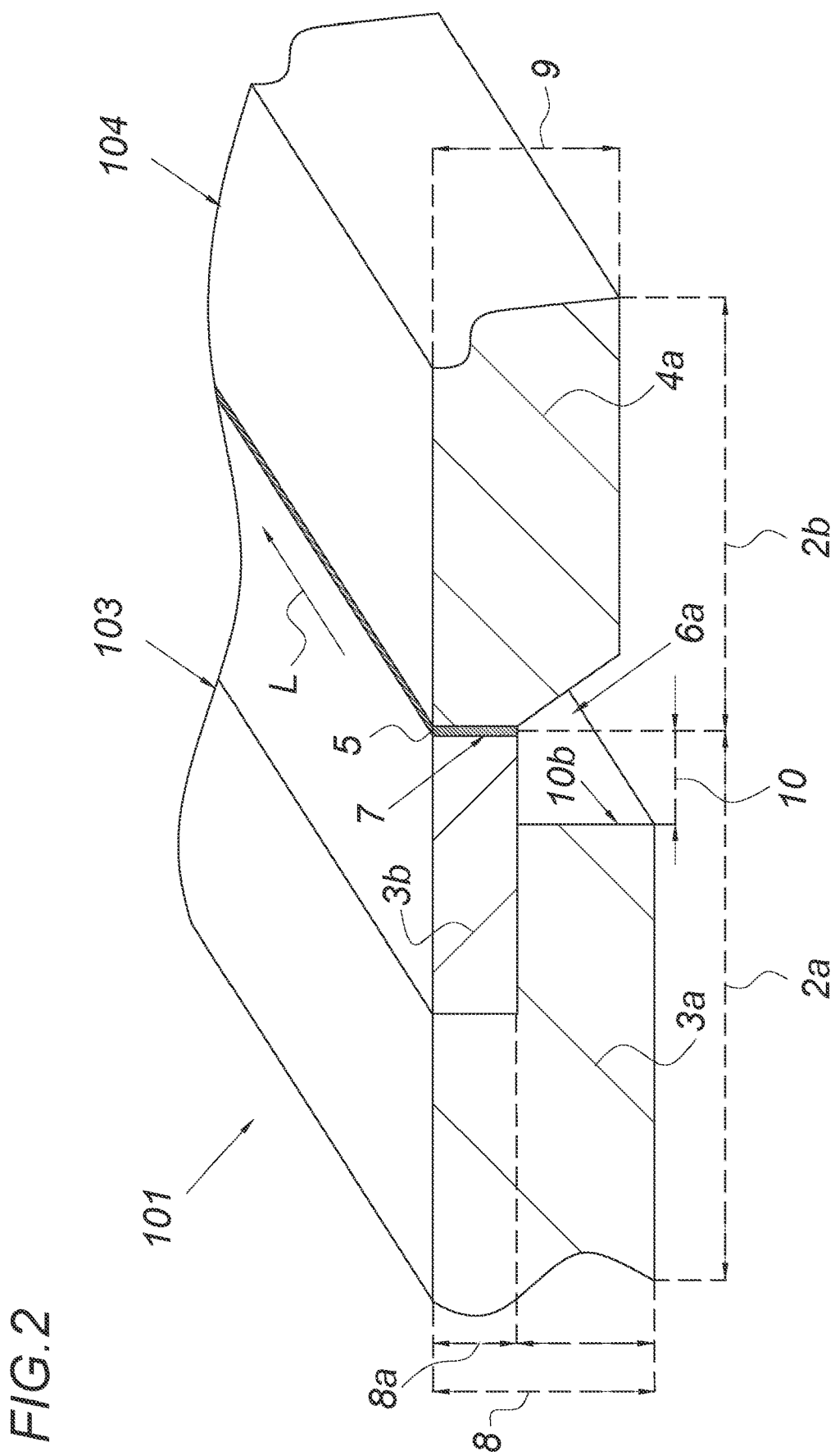
FIG. 2 shows a side view of a transversely cut metal strip according to a second exemplary embodiment.

In comparison to the metal strip 101 in FIG. 1, the metal strip 101 according to a second exemplary embodiment shown in FIG. 2 is manufactured out of different metal strips 103 and 104.

Thus the first cladding layer 3b is not cladded as a coating over the entire area of the first base layer 3a, but rather in this exemplary embodiment, is cladded in the form of a stripe-shaped coating, namely on the flat side of the base layer 3a, wherein the stripe on the base layer 3a extends along this longitudinal edge 6a or longitudinal side.

In addition, the second metal strip 104 has a thickness variation and in its maximum strip thickness 9, is greater than the layer thickness 8a of the cladding layer 3b. Despite this fact, the second metal strip 104, namely the second base layer 4a, exclusively adjoins the first cladding layer 3b. This is also true more particularly because the first base layer 3a has a recess 10 in the form of a notch 10b, which is recessed relative to the first cladding layer 3b, specifically starting from the latter. Thus in this second exemplary embodiment as well, the first metal strip 3 is uneven, or more precisely step-shaped, at its longitudinal edge 6a.

As a result, intermetallic and usually brittle phases in the butt seam 5 cannot occur, which ensures a high durability of the metal strip 101. In addition, this integral bonding can ensure advantageous electrical properties, which is of considerable importance for electric powered vehicles, among other things.

Figure 3:
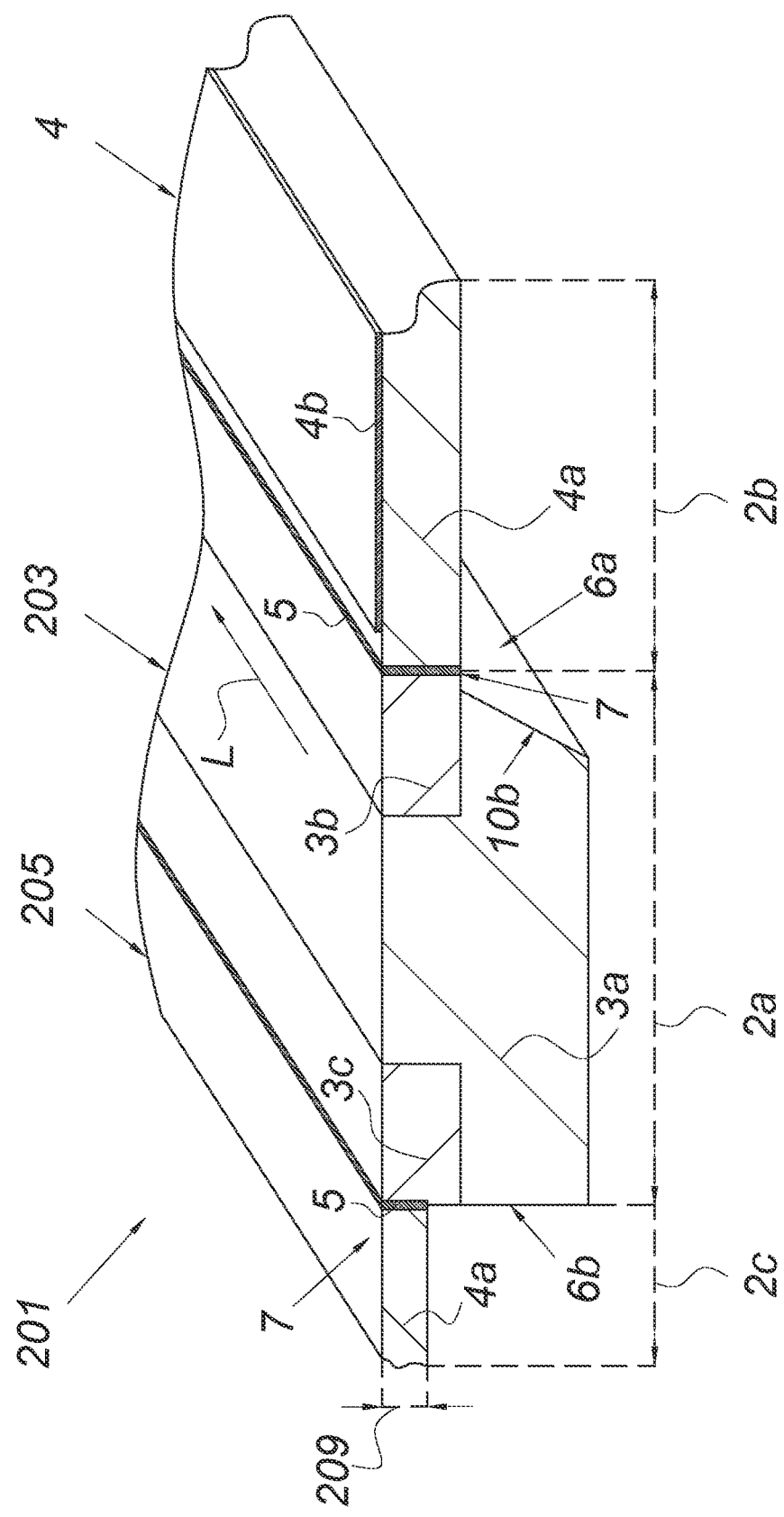
FIG. 3 shows a side view of a transversely cut metal strip according to a third exemplary embodiment.

According to the third exemplary embodiment in FIG. 3, the metal strip 201 has three strip transverse portions 2a, 2b, and 2c. Of these, the first strip transverse portion 2a consists of a first metal strip 203 with the first cladding layer 3b and a second cladding layer 3c. The two cladding layers 3b, 3c, which are for example the same in their material and for example in their dimensions, are cladded onto the first base layer 3a in the form of stripe-shaped coatings, namely on the flat side of the base layer 3a, which stripes each extend along one of the two parallel longitudinal edges 6a, 6b or longitudinal sides of the first metal strip 203. In this exemplary embodiment, the first metal strip 3 is even at its longitudinal edge 6b and is uneven, or more precisely step-shaped, at its longitudinal edge 6a.

In addition to the second metal strip 4, which is butt-welded to the first cladding layer 3b and forms the second strip transverse portion 2b, the metal strip 201 also has a third metal strip 205, which forms the third strip transverse portion 2c.

The third metal strip 205 bonded to the first metal strip 203 in the same way as the latter is to the second metal strip 4, which is also the case in all of the exemplary embodiments. The third metal strip 205, which is made of the same second base material 4a as the second metal strip 4, is welded to the second cladding layer 3c by means of a butt seam 5.

The strip thickness 209 of the third metal strip 205 is less than that of the second metal strip 4—but also forms a butt seam exclusively between the third metal strip 205 and the cladding layer 3c so that intermetallic and usually brittle phases in the butt seam 5 cannot occur. As a result, a durable metal strip 201 is achieved.

Metal strips 1, 101, and 201 of this kind are thus suitable for use as a semi-finished product or feedstock for an electrical contact, for example a press-fit pin, etc. In the prior art, the metal strip 1, 101, and 201 is often referred to as a hybrid metal strip, for example.

The invention claimed is:

1. A metal strip with comprising:
a first strip transverse portion made of a first metal strip, which has a first base layer made of aluminum or an aluminum alloy, and
a second strip transverse portion made of a second metal strip, which second metal strip has a tensile strength $(R_m) \geq 360$ MPa and a second base layer made of copper or a copper alloy,
wherein the first strip transverse portion and the second strip transverse portion are integrally bonded to each other by a butt seam extending along the metal strip, and the first metal strip has a first cladding layer made of copper or a copper alloy provided along at least one longitudinal edge on the first base layer and the butt seam extends essentially between the first cladding layer of the first strip transverse portion and the second strip transverse portion.

2. The metal strip according to claim 1, wherein the first base layer has an electrical conductivity of at least 9 MS/m.

3. The metal strip according to claim 1, wherein the butt seam extends exclusively between the first cladding layer and the second strip transverse portion.

4. The metal strip according to claim 1, wherein the first strip transverse portion has a first strip thickness that is greater than or equal to a second strip thickness of the second strip transverse portion.

5. The metal strip according to claim 4, wherein a thickness ratio of the first strip thickness of the first strip transverse portion to the second strip thickness of the second strip transverse portion is from 1:1 to 1:0.2.

6. The metal strip according to claim 1, wherein the second base layer
consists of a hardenable copper alloy or
consists of a low-alloy copper alloy or of a Cu—Sn alloy.

7. The metal strip according to claim 1, wherein the first cladding layer has a tensile strength $(R_m) < 420$ MPa.

8. The metal strip according to claim 1, wherein the first cladding layer consists of copper, or consists of a low-alloy copper alloy or of a Cu-Sn alloy.

9. The metal strip according to claim 1, wherein the first strip transverse portion has a recess that is recessed relative to the cladding layer at the longitudinal edge.

10. The metal strip according to claim 1, wherein the first cladding layer and the first base layer are roll-cladded and/or the butt seam is embodied as an I-seam.

11. The metal strip according to claim 1, wherein the butt seam extends exclusively between the first cladding layer and the second base layer.

12. The metal strip according to claim 1, wherein the second base layer consists of one of the group consisting of: a CuNi1.5Si alloy, a CuNi3Si1Mg alloy, a CuNi2SiSn alloy, a CuFe2P alloy, and a CuSn6 alloy.

13. A semi-finished product or feedstock made of the metal strip according to claim 1 for at least one electrical component.

14. A process for continuously manufacturing the metal strip according to claim 1, the process comprising:
providing the first metal strip with the first base layer made of aluminum or an aluminum alloy and with the first cladding layer made of copper or a copper alloy, wherein the first cladding layer is provided on the first base layer along at least the longitudinal edge of the first metal strip, and
providing the second metal strip with the tensile strength $(R_m) \geq 360$ MPa and with the second base layer consisting of copper or a copper alloy, and
welding the first metal strip and the second metal strip to each other continuously along the longitudinal side forming a butt-joint, wherein the second metal strip, which adjoins the first cladding layer in an essentially abutting fashion, is welded to the first cladding layer.

15. The process according to claim 14, wherein the second metal strip, exclusively adjoins the first cladding layer in an abutting fashion.

16. The process according to claim 14, wherein the first metal strip and the second metal strip are welded to each other using a beam welding process.

17. The process according to claim 14, wherein the first cladding layer and the first base layer are roll-cladded.

18. The process according to claim 14, wherein before the welding, the first metal strip, is provided with a recess that is recessed relative to the first cladding layer at the longitudinal edge.

19. The process according to claim 14, wherein the first metal strip and the second metal strip are welded to each other using a laser.

20. The process according to claim 14, wherein before the welding, the first metal strip is provided with a bevel or a notch that is recessed relative to the first cladding layer at the longitudinal edge.

* * * * *

UNITED STATES PATENT AND TRADEMARK OFFICE
CERTIFICATE OF CORRECTION

| | | |
|---|---|---|
| PATENT NO. | : 12,030,133 B2 | Page 1 of 1 |
| APPLICATION NO. | : 18/249200 | |
| DATED | : July 9, 2024 | |
| INVENTOR(S) | : Robert Gegenhuber | |

It is certified that error appears in the above-identified patent and that said Letters Patent is hereby corrected as shown below:

In the Claims

Column 7, Line 2, "metal strip with comprising" should read -- metal strip comprising --.

Signed and Sealed this
Eighth Day of October, 2024

Katherine Kelly Vidal
*Director of the United States Patent and Trademark Office*